J. H. MASON.
SECTIONAL COAL AUGER NUT.
APPLICATION FILED NOV. 15, 1919.
Reissued May 24, 1921. 15,112.
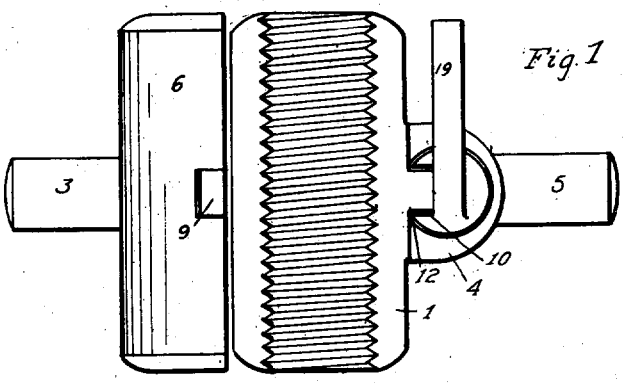
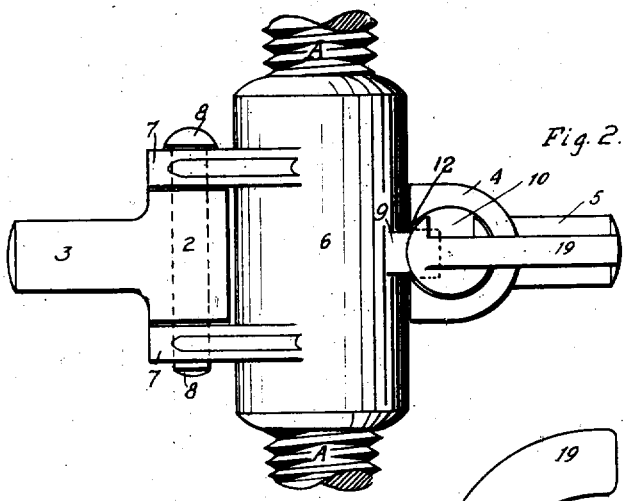
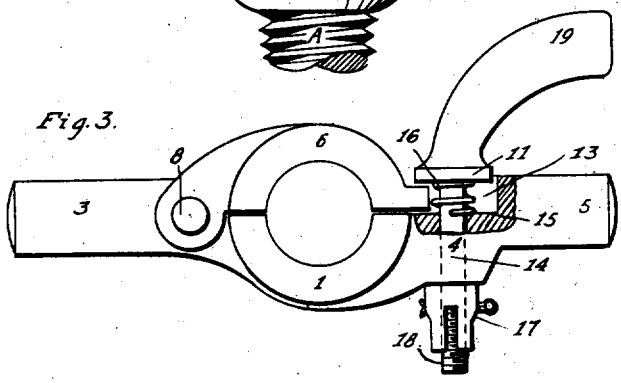
INVENTOR
Julius H. Mason
BY Frease, Merkel, Caywell and Bond
ATTYS.

UNITED STATES PATENT OFFICE.

JULIUS HARWOOD MASON, OF DUNCAN FALLS, OHIO, ASSIGNOR, BY DIRECT AND MESNE ASSIGNMENTS, TO C. C. HARTZELL, DOING BUSINESS AS THE HARTZELL SALES COMPANY, OF HUNTINGTON, WEST VIRGINIA.

SECTIONAL COAL-AUGER NUT.

15,112. Specification of Reissued Letters Patent. Reissued May 24, 1921.

Original No. 1,297,215, dated March 11, 1919, Serial No. 246,251, filed July 22, 1918. Application for reissue filed November 15, 1919. Serial No. 338,394.

*To all whom it may concern:*

Be it known that I, JULIUS HARWOOD MASON, a citizen of the United States, residing at Duncan Falls, in the county of Muskingum and State of Ohio, have invented a new and useful Improvement in Sectional Coal-Auger Nuts, of which the following is a specification.

My invention relates to improvements in sectional coal-auger nuts in which the locks are permanently attached; and the object of my invention is, to provide a sectional coal-auger nut with a permanently attached lock device having an improved operating, locking, and adjustable wear-compensating construction.

I attain this object by the mechanism illustrated in the accompanying drawing, in which—

Figure 1 is a top view of the improved nut in open position;

Fig. 2, a top view in locked position embracing an auger shank; and

Fig. 3, a view in elevation with parts broken away, showing detail construction of lock.

Similar numerals and letters refer to similar parts throughout the several views.

The numeral 1 indicates a half-nut section provided centrally of its length, and on one side with the hinge element 2 and trunnion 3, and on the other side with the lock element 4 and trunnion 5. The other half-nut section 6 is provided centrally of its length and on one side with the hinge element 7 which engages the hinge element 2 by means of the pin 8. The section 6 is provided on its opposite and opening side with a lug 9 adapted to pass clear through the slot 10 provided in the key-head 11, and to pass into and out of the slot 12 provided in the lock element 4, said slots 10 and 12 being adapted to register. The lock element 4 is provided with communicating key-holes 13 and 14, forming an annular shoulder 15 which supports the spiral spring 16 which in turn supports the key-head 11 in its various positions of longitudinal adjustment in the key-hole 13, and retains said key-head in positions fittingly to lock the half-nut sections 1 and 6 around the auger-shank (A). The key-head 11 is adapted to entirely enter and to be longitudinally adjusted in the key-hole 13 by means of a castellated-nut 17 in combination with the screw-shank 18 of the key and with the lower face of the lock element 4. The key is also provided with the handle 19.

The operation of my invention is as follows: The key by means of the handle 19 is turned in the key-holes until the slot 10 in the key-head 11 registers with the slot 12 in the lock element 4. The section 6 is thus swung on its hinges until its lug 9 passes into the registering slots and the end of the said lug passes clear through the slot 10, whereupon the key is turned until the slot 10 is out of register with the slot 12 and the solid annular edge of the key-head 11 passes over the end of said lug, thereby locking the section 6 and the section 1 in closed position. When wear prevents the sections, in closed position, from fittingly embracing the screw-threaded auger shank (A), the key-head 11 is adjustably drawn down into the key-hole 13 by means of the castellated nut 17 until the sections in closed position do fit the auger shank.

I claim:—

1. In a sectional coal-auger nut, the combination with one of the nut sections provided with a lock having a key-hole and a slot communicating with said key-hole, and also, having a key provided with a head having a slot adapted to register with said lock slot, of the other nut section provided with a lug adapted, in closing said nut sections, to pass into said registering slots and clear through said key-head slot and into said key-hole, and to be locked therein by means of said key-head, substantially as described.

2. In a sectional coal-auger nut, the combination with one of the nut sections provided with a lock having a key-hole and a slot communicating with said key-hole, and also having a key provided with a head having a slot adapted to register with said lock slot; and also having means in combination with said key adapted to adjust it longitudinally in said key hole, of the other nut section provided with a lug adapted, in closing said nut sections, to pass into said registering slots and clear through said key-head slot and into said key-hole, and to be locked therein by means of said key-head, substantially as described.

3. In a sectional coal-auger nut, the combination of two nut sections one of the nut sections provided with a lock having a key, said lock having communicating key-holes and a resultant annular shoulder, the upper key-hole communicating with a slot; and said key having a head adapted to enter and longitudinally to be adjusted in the upper key-hole, and also provided with a slot adapted to register with the slot in said upper key-hole, the shank of said key being adapted to pass through and to extend beyond said lower key-hole, said extended end being provided with screw threads, interposed between a nut adapted to adjust said key, longitudinally, in said key holes; and a spiral spring interposed between said annular shoulder and key head, and adapted to support said key-head in locking position, the other nut section provided with a lug adapted, in closing said nut sections, to pass into said registering slots and clear through said key-head slot and into said upper key-hole, and to be locked therein by means of said key-head, substantially as described.

4. In a sectional coal-auger nut the combination of nut sections hinged together, a lock element at the free edge of one section, provided with a slot, a key head journaled in said lock element at right angles to the plane of separation of the nut sections and a lug upon the other section arranged to be received within said slot when the sections are closed, the key head being adapted to engage said lug when turned to the locked position.

5. In a sectional coal auger nut, the combination of nut sections hinged together, a key head journaled in one section at right angles to the plane of separation of the nut sections and provided with a cut away portion and a lug upon the other section arranged to be received through the cut-out portion when the sections are closed, the key head being adapted to engage said lug when turned to the locked position.

6. In a sectional coal-auger nut the combination of nut sections hinged together, a lock element at the free edge of one section provided with a slot, a key head journaled in said lock element at right angles to the plane of separation of the nut sections and provided with a cut away portion and a lug upon the other section arranged to be received through said cut away portion and within said slot when the sections are closed, the key head being adapted to engage said lug when turned to the locked position.

JULIUS HARWOOD MASON.